(12) United States Patent
Saathoff et al.

(10) Patent No.: US 10,666,360 B2
(45) Date of Patent: May 26, 2020

(54) TRANSMITTER OPTICAL SIGNAL TO NOISE RATIO IMPROVEMENT THROUGH RECEIVER AMPLIFICATION IN SINGLE LASER COHERENT SYSTEMS

(71) Applicant: Elenion Technologies, LLC, New York, NY (US)

(72) Inventors: Guido Saathoff, Munich (DE); Matthew Akio Streshinsky, New York, NY (US); Robert Palmer, Munich (DE); Torsten Wuth, Munich (DE)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/585,700

(22) Filed: Sep. 27, 2019

(65) Prior Publication Data

US 2020/0099452 A1 Mar. 26, 2020

Related U.S. Application Data

(63) Continuation of application No. 16/170,850, filed on Oct. 25, 2018, now Pat. No. 10,469,171, which is a continuation of application No. 15/405,516, filed on Jan. 13, 2017, now Pat. No. 10,135,536, which is a continuation of application No. 14/794,889, filed on Jul. 9, 2015, now Pat. No. 9,571,200.

(51) Int. Cl.
*H04B 10/00* (2013.01)
*H04B 10/40* (2013.01)
*H04B 10/61* (2013.01)

(52) U.S. Cl.
CPC .......... *H04B 10/40* (2013.01); *H04B 10/615* (2013.01); *H05K 999/99* (2013.01)

(58) Field of Classification Search
CPC ........... H04B 10/2916; H04B 10/2912; H04B 10/1125; H04B 10/40; H04B 10/2937; H04B 10/615; H04J 14/0221; H04J 14/02
USPC ...................................................... 398/136
See application file for complete search history.

(56) References Cited

U.S. PATENT DOCUMENTS

| 7,522,842 B1* | 4/2009 | McNicol | H04B 10/2916 398/157 |
| 2003/0185503 A1* | 10/2003 | Badr | H04B 10/291 385/24 |
| 2004/0085624 A1* | 5/2004 | Liu | H01S 3/06758 359/341.3 |
| 2013/0343751 A1* | 12/2013 | Mamyshev | H04B 10/61 398/38 |

* cited by examiner

*Primary Examiner* — Don N Vo
(74) *Attorney, Agent, or Firm* — Stratford Managers Corporation

(57) ABSTRACT

A transceiver having an improved transmitter optical signal to noise ratio, and methods of making and using the same.

17 Claims, 4 Drawing Sheets

TRANSMITTER OPTICAL SIGNAL TO NOISE RATIO IMPROVEMENT THROUGH RECEIVER AMPLIFICATION IN SINGLE LASER COHERENT SYSTEMS

CROSS-REFERENCE TO RELATED APPLICATIONS

This application is a continuation of U.S. patent application Ser. No. 16/170,850, filed Feb. 28, 2019, now allowed, which is a continuation of U.S. patent application Ser. No. 15/405,516, filed Jan. 13, 2017, now U.S. Pat. No. 10,135,536, which is a continuation of U.S. patent application Ser. No. 14/794,889, filed Jul. 9, 2015, now U.S. Pat. No. 9,571,200, which are hereby incorporated by reference herein in their entirety.

FIELD OF THE INVENTION

The invention relates to optical communication systems in general and particularly to a receiver for an optical communication system.

BACKGROUND OF THE INVENTION

In coherent optical communication systems, optical amplifiers are often used at the output of the transmitter (Tx). Additionally, in power- and cost-constrained systems, a single laser may be shared between the transmitter and local oscillator (LO) in the receiver (Rx). In such a system using a Tx optical amplifier, the output Tx optical signal to noise ratio (OSNR) is typically limited by amplified spontaneous emission (ASE) noise due to the optical amplifier. The OSNR can be improved by reducing the insertion loss of the transmitter or by increasing the laser power dedicated to the transmitter. Typically, both of these parameters are fixed.

FIG. 1 is a schematic block diagram 100 of a prior art coherent optical transceiver 102, in which in-line power monitor photodiodes and fiber optic splices are omitted. A WDM coupler couples the light from pump laser 114 into the Tx EDFA 106. The Tx photodiode (PD) 116 is used to control the Tx EDFA 106 gain via a feedback loop 118 to control the pump laser 114 current. The light from the tunable laser 108 is shared between Tx 110 and Rx 112 and its splitting ratio is dictated by the required LO power $P_{LO}$ as explained below. The incoming receiver signal power $P_r$ and the target photo current $I_t \propto \sqrt{P_{LO} P_r}$ determine the LO power $P_{LO}$ and, therefore, the Tx power $P_{Tx}$. As shown in FIG. 1, an electrical TX input 120, an optical Tx output 122, an optical RX input 130 and an electrical Rx output 132 are present.

The proportion of the system laser power dedicated to the Tx, $P_{Tx}$, is dictated by what is needed for the LO in the receiver. The required LO power, $P_{LO}$, is determined by the amount of gain one needs in the receiver. In coherent intradyne detection, the input received optical signal, $P_r$, is mixed with a higher powered local oscillator $P_{LO}$ near the same frequency in order to boost the power in the mixing products at the intermediate frequencies $\omega_{IF} = \omega_r - \Omega_{LO}$, where $\omega_r$ is a frequency within the signal bandwidth. Given a signal input power $P_r$, detector responsivity R, and target current output $I_t \propto R\sqrt{P_{LO}}\sqrt{P_r}$, the LO power is fixed.

There is a need for systems that provide an optical communication system with improved optical signal to noise ratio.

SUMMARY OF THE INVENTION

According to one aspect, the invention features an optical transceiver for receiving an electrical input signal and outputting an optical output signal responsive to the electrical input signal, and for receiving an optical input signal and outputting an electrical output signal responsive to the optical input signal, comprising:

a first shared optical source configured to provide pump light;

a first splitter configured to split the pump light into a first transmitter pump light portion and a second receiver pump light portion, the first splitter configured to split the pump light into desired proportions based on the first transmitter pump light portion required for amplification of the optical output signal;

a first optical amplifier configured to receive the first transmitter pump light portion and amplify the optical output signal;

a second optical amplifier configured to receiver the second receiver pump light portion and amplify the optical input signal;

a second shared optical source configured to generate input light;

a second variable splitter configured to split the input light into signal light and local oscillator (LO) light, the second variable splitter configurable to provide a splitting ratio based on the LO light required for amplification of the optical input signal, and the second receiver pump light provided by the first splitter;

an optical transmitter configured to receive the signal light and the electrical input signal and to transmit the optical output signal; and a coherent optical receiver configured to receive the input optical signal and the local oscillator (LO) light and to output the electrical output signal;

wherein the splitting ratio is configurable based on the desired proportions of the first splitter to trade off receiver dynamic range and transmitter optical signal to noise ratio.

In one embodiment, the first coherent optical source is a tunable laser.

In another embodiment, the second coherent optical source is a pump laser.

In still another embodiment, at least one of the first optical amplifier and the second optical amplifier is a fiber amplifier.

In yet another embodiment, the fiber amplifier is an EDFA.

In a further embodiment, the first optical feedback loop control comprises a photodetector and an optical feedback loop controller.

In yet a further embodiment, the optical intensity controller is a variable optical attenuator.

In an additional embodiment, the second optical amplifier configured to receive an input optical signal from the second coherent optical source is in optical connection to the second coherent optical source by way of an optical splitter.

In one more embodiment, the improved optical signal to noise ratio is an improved transmitter optical signal to noise ratio.

In still another embodiment, the transceiver having an improved optical signal to noise ratio further comprises a variable power splitter configured to receive optical power from the first coherent optical source and configured to provide illumination with intensity $P_T$ to the transmitter and illumination with intensity $P_{LO}$ to the receiver so that the ratio between the intensity $P_T$ and the intensity $P_{LO}$ can be set to a desired value.

According to another aspect, the invention features an improved transceiver having an improved optical signal to noise ratio, the transceiver having a transmitter having an electrical transmitter input port and an optical transmitter output port, a receiver having an optical receiver input port and an electrical receiver output port, a first coherent optical source shared between the transmitter and the receiver and configured to provide illumination with intensity $P_T$ to the transmitter and illumination with intensity $P_{LO}$ to the receiver, and a second coherent optical source in optical communication with the optical transmitter output port by way of an optical coupler, the optical transmitter output port comprising a first optical amplifier, the second coherent optical source having a first optical feedback loop control; wherein the improvement comprises: a second optical amplifier configured to receive an input optical signal from the second coherent optical source, and to provide amplified illumination to an optical intensity controller, the optical intensity controller configured to provide controlled intensity illumination to the receiver, the optical intensity controller being part of a second feedback loop.

According to yet another aspect, the invention relates to a method of making a transceiver having an improved optical signal to noise ratio. The method comprises the steps of: providing a transmitter having an electrical transmitter input port and an optical transmitter output port; providing a receiver having an optical receiver input port and an electrical receiver output port; providing a first coherent optical source shared between the transmitter and the receiver and configured to provide illumination with intensity $P_T$ to the transmitter and illumination with intensity $P_{LO}$ to the receiver; providing a second coherent optical source in optical communication with the optical transmitter output port by way of an optical coupler, the optical transmitter output port comprising a first optical amplifier, the second coherent optical source having a first optical feedback loop control; and providing a second optical amplifier configured to receive an input optical signal from the second coherent optical source, and to provide amplified illumination to an optical intensity controller, the optical intensity controller configured to provide controlled intensity illumination to the receiver, the optical intensity controller being part of a second feedback loop.

According to still another aspect, the invention relates to a method of using a transceiver having an improved optical signal to noise ratio. The method comprises the steps of: providing a transmitter having an electrical transmitter input port and an optical transmitter output port; providing a receiver having an optical receiver input port and an electrical receiver output port; providing a first coherent optical source shared between the transmitter and the receiver and configured to provide illumination with intensity $P_T$ to the transmitter and illumination with intensity $P_{LO}$ to the receiver; providing a second coherent optical source in optical communication with the optical transmitter output port by way of an optical coupler, the optical transmitter output port comprising a first optical amplifier, the second coherent optical source having a first optical feedback loop control; providing a second optical amplifier configured to receive an input optical signal from the second coherent optical source, and to provide amplified illumination to an optical intensity controller, the optical intensity controller configured to provide controlled intensity illumination to the receiver, the optical intensity controller being part of a second feedback loop; operating the first coherent optical source and the second coherent optical source; applying at least one of an electrical input signal to the electrical transmitter input port and an optical input signal to the optical receiver input port; and performing at least one of: transmitting an optical signal responsive to the electrical input signal; and receiving an electrical signal responsive to the optical input signal.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Acronyms

A list of acronyms and their usual meanings in the present document (unless otherwise explicitly stated to denote a different thing) are presented below.

ASE Amplified Spontaneous Emission
CMOS Complementary Metal-Oxide-Semiconductor
DBR Distributed Bragg Reflector
DSP Digital Signal Processor
ECL External Cavity Laser
EDFA Erbium Doped Fiber Amplifier
E/O Electro-optical
FDTD Finite Difference Time Domain
FFE Feed-Forward Equalization
FOM Figure of Merit
FSR Free Spectral Range
FWHM Full Width at Half Maximum
LIV Light intensity(L)-Current(I)-Voltage(V)
OSNR Optical Signal to Noise Ratio
PIC Photonic Integrated Circuits
PRBS Pseudo Random Bit Sequence
PDFA Praseodymium-Doped-Fiber-Amplifier
RSOA Reflective Semiconductor Optical Amplifier
Rx Receiver
SMSR Single-Mode Suppression Ratio
Tx Transmitter
VOA Variable Optical Attenuator
WDM Wavelength Division Multiplexing This invention involves sharing the pump laser power used to operate the Tx fiber amplifier with an additional Rx fiber amplifier in order to improve the output Tx power and, as a result, the Tx OSNR of a coherent optical transceiver using a single pump laser source. Since the output signal power and the required gain of the Rx optical amplifier is much lower than those of the Tx optical amplifier, only a small fraction of the pump laser power is required for the Rx optical amplifier.

Example Implementation

Figure 1:
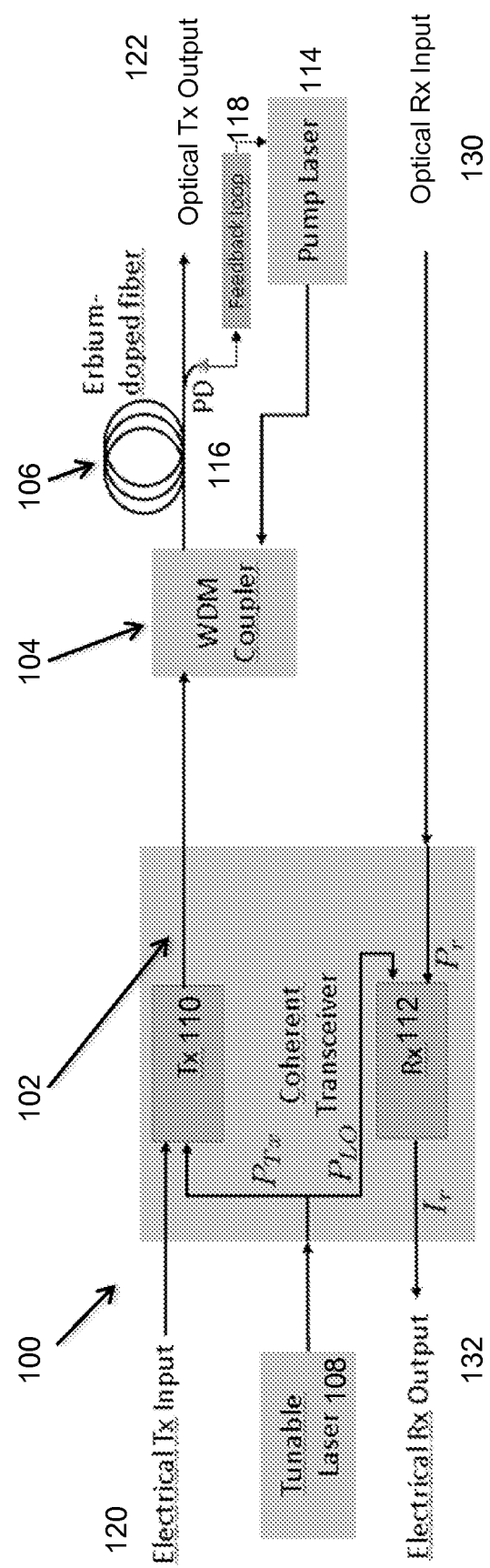
FIG. 1 is a schematic block diagram of a prior art coherent optical transceiver.
Figure 2:
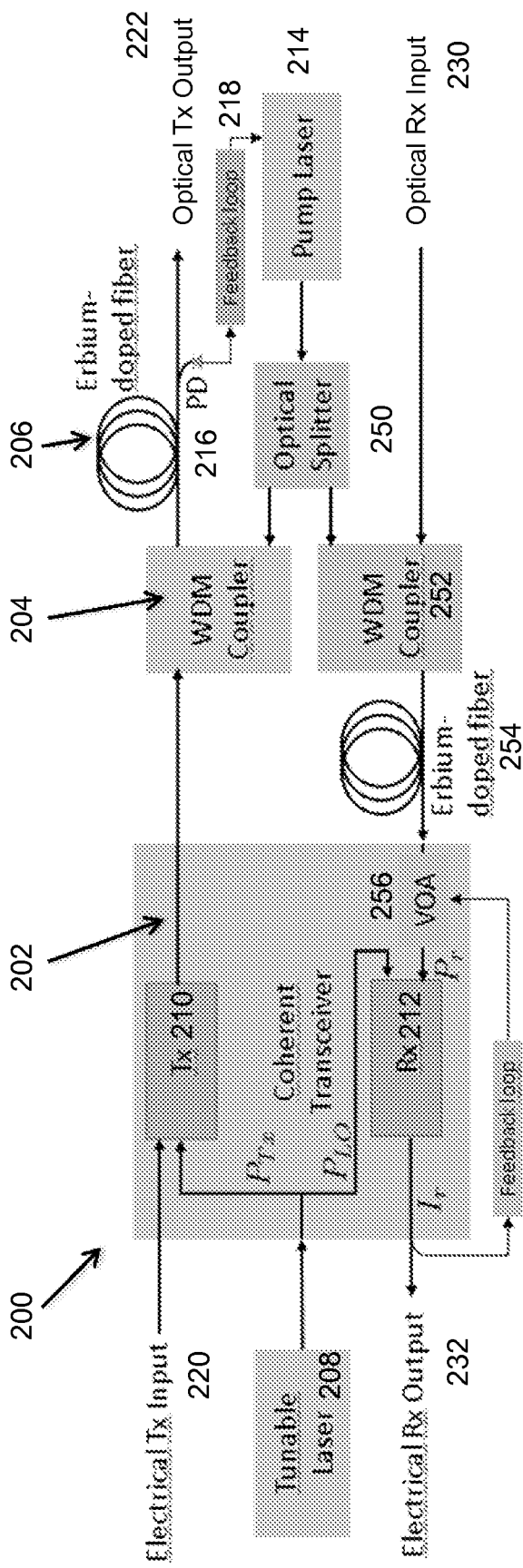
FIG. 2 is a schematic diagram of one embodiment of an apparatus having a single pump laser source for two Erbium-doped fiber coils according to principles of the invention.

FIG. 2 is a schematic diagram of one embodiment of an apparatus having a single pump laser source for two amplification fiber coils (in the embodiment illustrated, the amplification fiber coils are Erbium-doped fiber amplifier coils) according to principles of the invention. The method of using a single pump laser source for two amplification fiber coils is also described. The required gain and output power in the Rx optical amplifier is much lower than in the Tx optical amplifier. Therefore, the optical splitter need only tap off a small fraction of the pump laser power for the Rx optical amplifier. In other embodiments, amplifiers other than EDFA amplifiers may be used.

As illustrated in FIG. 2 is a schematic block diagram 200 of a prior art coherent optical transceiver 202, in which in-line power monitor photodiodes and fiber optic splices are omitted. The pump laser 214 provides illumination to an optical splitter 250 which can split the illumination in desired proportions. One portion of the illumination from the pump laser 214 is provided to the WDM coupler 204 that couples into the optical Tx output. The Tx photodiode (PD) 216 is used to control the Tx EDFA 206 gain via a feedback loop 218 that samples the output of Tx EDFA 206 and controls the current driving the pump laser 214. Another portion of the illumination from the pump laser 214 is provided by signal splitter 250 to the WDM coupler 252 that feeds an Erbium-doped fiber 256 which provides amplification of illumination entering on the Optical Rx input 230. The amplified light exits the Erbium-doped fiber 256 and is fed into a VOA 256 that in turn feeds into the Rx 212. The VOA 256 is controlled by a feedback loop 258 that samples the output of Rx 212, and provides a control signal to the VOA 256.

The light from the tunable laser 208 is shared between Tx 210 and Rx 212 and its splitting ratio is dictated by the required LO power $P_{LO}$. As shown in FIG. 2, an electrical TX input 220, an optical Tx output 222, an optical RX input 230 and an electrical Rx output 232 are present.

An increase of the signal power, $P_r$, at the receiver through an additional optical pre-amplifier with gain $G_r$ in front of the receiver allows one to lower the required LO power $P_{LO}$ by the same factor $G_r$. In amplifier-noise limited transmission, for example in metro and long haul links using optical amplifier chains, the decrease in signal-to-noise ratio (SNR) at the receiver associated with the additional optical pre-amplifier noise is marginal as can be seen by the Friis formula:

$$F_{total} = F_1 + \frac{F_2-1}{G_1} + \frac{F_3-1}{G_1G_2} + \frac{F_4-1}{G_1G_2G_3} + \ldots + \frac{F_n-1}{G_1G_2\ldots G_{n-1}}$$

Here, $F_{total}$ is the noise figure of the complete amplifier chain with amplifiers exhibiting individual gains $G_i$ and noise figures $F_i$. The contribution of the last amplifier, in our case the additional optical pre-amplifier for the receiver, is strongly suppressed.

However despite of the benefit of an optical pre-amplifier, it is often not desirable to duplicate the pump laser due to cost and space concerns. Additionally, the electrical power required by an additional pump laser would be disadvantageous in small form factor devices, such as the CFP2 form factor.

While the Tx EDFA gain is controlled via the EDFA pump power, the gain control of the Rx EDFA fed by the same pump would require an additional variable optical attenuator (VOA) for the Rx EDFA pump light.

In the present invention, one uses a free running (not gain-controlled) Rx EDFA and one controls the Rx EDFA output power with a VOA. The Rx input VOA can more easily be implemented in the receiver input signal path.

For purposes of elucidation of features of the invention, one can stipulate that the coherent transceiver block outputs an average modulated Tx output power of −17 dBm. In conventional optical communication systems the typical system output power requirements are at least +1 dBm. Therefore, the Tx optical amplifier needs to supply 18 dB of gain. This may be accomplished with 18 meters of erbium-doped fiber and 30 mW of pump power.

In the Rx, only 5 or 10 dB of gain is desired, which can be accomplished with 5 meters of erbium-doped fiber and less than 10 mW of pump optical power. Therefore, a 40 mW pump laser can be used and a 1:4 splitter can supply both EDFA coils.

The 16 dBm laser input was previously being split 50:50 between Tx and Rx LO. With an Rx amplifier, 9 dBm could be used for the LO instead of 13 dBm. This would allow the Tx to use 15 dBm, for a gain in output OSNR of 2 dB.

Those of ordinary skill in the art will understand that the numerical values provided in the embodiment describe represent one example, and are provided for the purpose of explanation. Actual numerical values and power requirements may vary in different embodiments.

Figure 3:
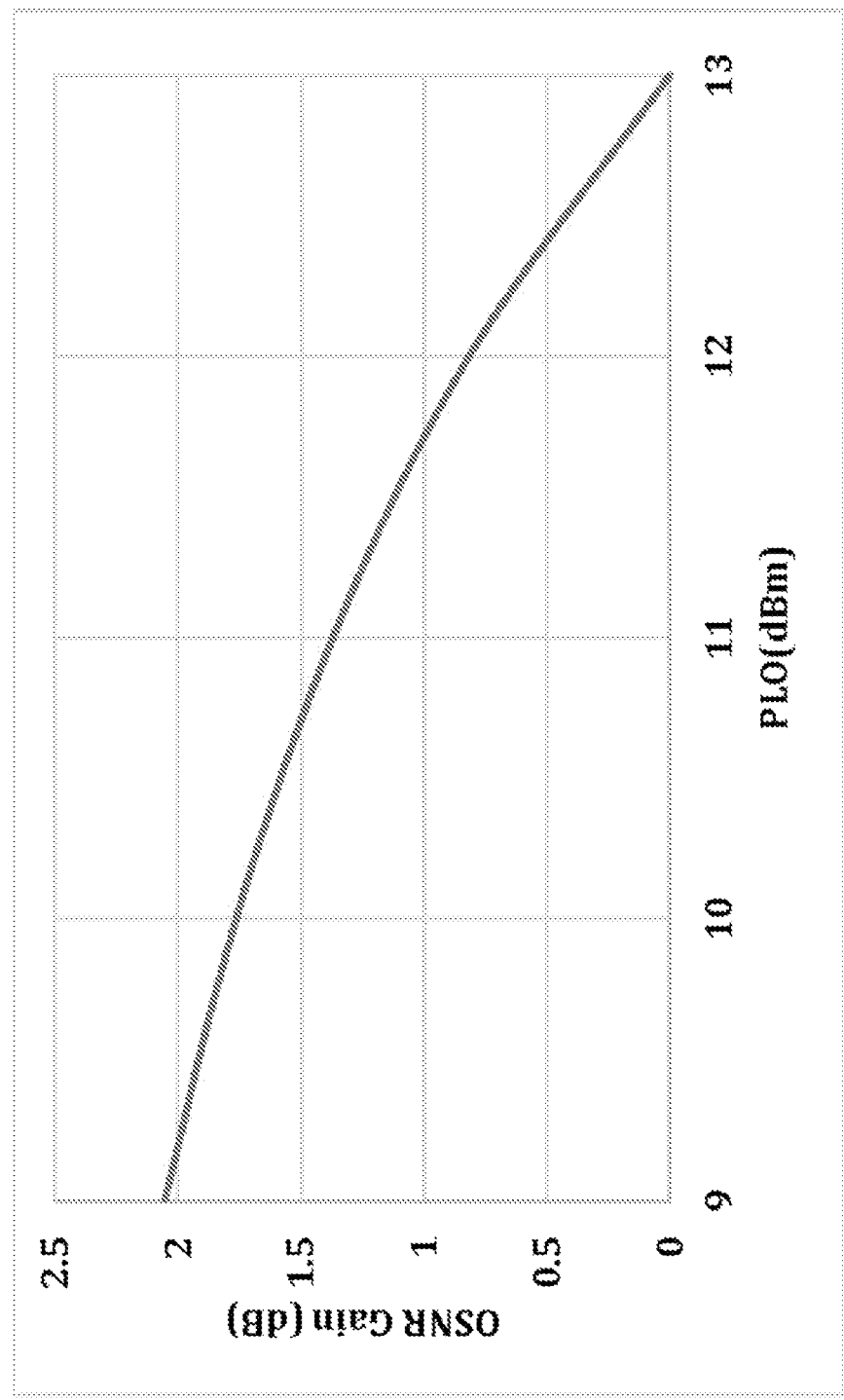
FIG. 3 is a graph showing the OSNR gain vs LO power relative to a 50:50 split of a 16 dBm output power tunable laser.

FIG. 3 is a graph showing the OSNR gain vs LO power relative to a 50:50 split of a 16 dBm output power tunable laser. Reducing $P_{LO}$ from 13 dBm to 9 dBm allows one to increase $P_{Tx}$ from 13 dBm to 15 dBm, thus boosting Tx OSNR by 2 dB.

As has been explained, the Rx fiber amplifier can be used to increase the Tx power/OSNR as much as possible. This is optimal for OSNR limited systems.

Figure 4:
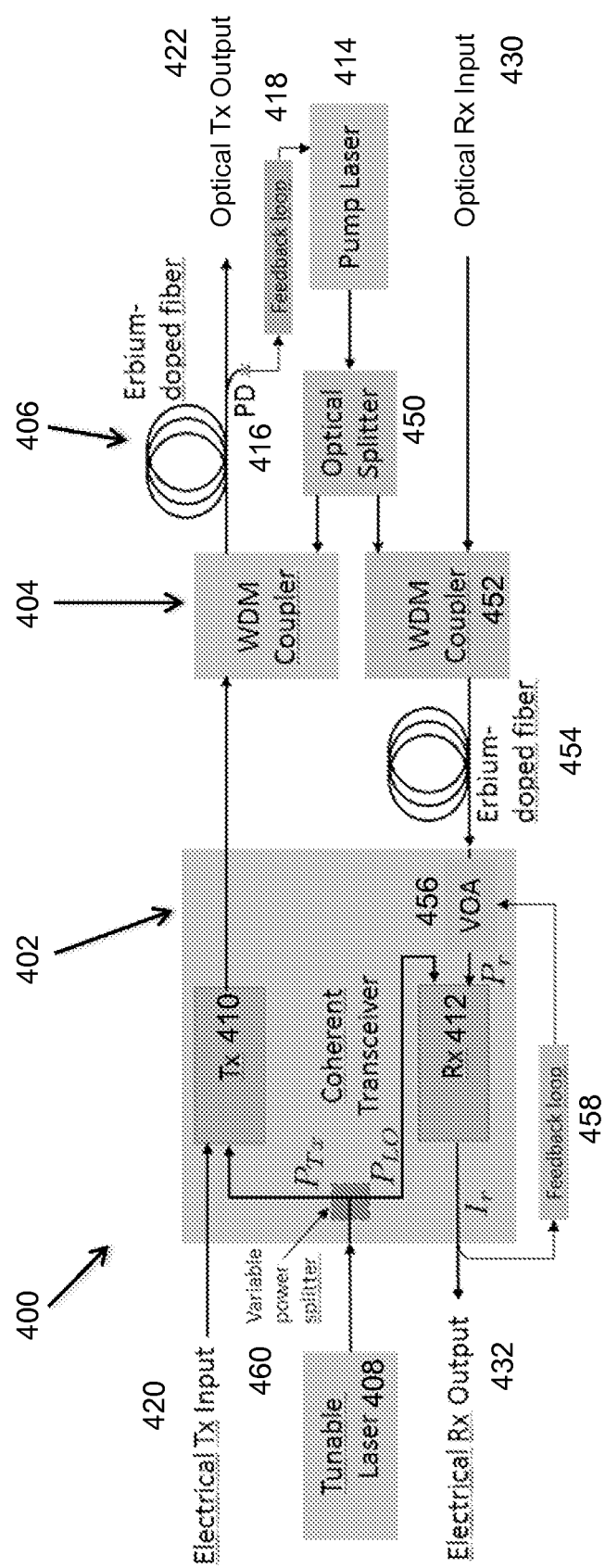
FIG. 4 is a schematic diagram of one embodiment of an apparatus having a single pump laser source for two Erbium-doped fiber coils and a tunable laser with a variable power splitter according to principles of the invention.

FIG. 4 is a schematic diagram of one embodiment of an apparatus having a single pump laser source for two Erbium-doped fiber coils and a tunable laser with a variable power splitter according to principles of the invention. In the embodiment illustrated, the amplification fiber coils are Erbium-doped fiber amplifier coils. In other embodiments, amplifiers other than EDFA amplifiers may be used.

As illustrated in FIG. 4 is a schematic block diagram 400 of a prior art coherent optical transceiver 402, in which in-line power monitor photodiodes and fiber optic splices are omitted. The pump laser 414 provides illumination to an optical splitter 450 which can split the illumination in desired proportions. One portion of the illumination from the pump laser 414 is provided to the WDM coupler 404 that couples into the optical Tx output. The Tx photodiode (PD) 416 is used to control the Tx EDFA 406 gain via a feedback loop 418 that samples the output of Tx EDFA 406 and controls the current driving the pump laser 414. Another portion of the illumination from the pump laser 414 is provided by signal splitter 450 to the WDM coupler 452 that feeds an Erbium-doped fiber 456 which provides amplification of illumination entering on the Optical Rx input 430. The amplified light exits the Erbium-doped fiber 456 and is fed into a VOA 456 that in turn feeds into the Rx 412. The VOA 456 is controlled by a feedback loop 458 that samples the output of Rx 412, and provides a control signal to the VOA 456.

The light from the tunable laser 408 is shared between Tx 410 and Rx 412 and its splitting ratio is controlled by a variable power splitter 460 so that the ratio between the Tx power $P_{Tx}$ (or the intensity $P_T$) and the LO power $P_{LO}$ (or the intensity $P_{LO}$) can be varied and can be set to a desired value. As shown in FIG. 4, an electrical TX input 420, an optical Tx output 422, an optical RX input 430 and an electrical Rx output 432 are present.

In combination with the single laser transceiver and a Rx fiber amplifier, a tunable laser with a variable power splitter in the transceiver allows for variable split ratios between the Tx power and the LO power. This variability enables a flexible trade-off between Tx OSNR and Rx sensitivity and dynamic range. In combination with a variable power splitter on the transceiver, as shown in FIG. 4, the shared pump Rx fiber amplifier provides a flexible transceiver capable of trading off Rx dynamic range vs Tx OSNR and, thus, extending the range of applications.

It is believed that for future metro and short reach networks which may be Rx input power limited, the shared pump Rx fiber amplifier could also be used to increase receiver dynamic range at the expense of Tx OSNR. By dedicating more laser power to the LO of the Rx together with the amplification of the Rx input signal, the Rx sensitivity/dynamic range could be significantly increased. For a 50/50 split (13 dBm LO power for a 16 dBm input power laser), the full gain (5 to 10 dB) of the Rx fiber amplifier would be usable to increase the Rx sensitivity.

Design and Fabrication

Methods of designing and fabricating devices having elements similar to those described herein are described in one or more of U.S. Pat. Nos. 7,200,308, 7,339,724, 7,424,192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

Definitions

As used herein, the term "optical communication channel" is intended to denote a single optical channel, such as light that can carry information using a specific carrier wavelength in a wavelength division multiplexed (WDM) system. In some embodiments, the the Rx input signal can in principle carry a large number of optical communication channels. The LO is used to select which of them shall be detected at any given time.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical transceiver for receiving an electrical input signal and outputting an optical output signal responsive to the electrical input signal, and for receiving an optical input signal and outputting an electrical output signal responsive to the optical input signal, comprising:
   a first shared optical source configured to provide pump light;
   a first splitter configured to split the pump light into a first transmitter pump light portion and a second receiver pump light portion, the first splitter configured to split the pump light into desired proportions based on the first transmitter pump light portion required for amplification of the optical output signal;
   a first optical amplifier configured to receive the first transmitter pump light portion and amplify the optical output signal;
   a second optical amplifier configured to receiver the second receiver pump light portion and amplify the optical input signal;
   a second shared optical source configured to generate input light;
   a second variable splitter configured to split the input light into signal light and local oscillator (LO) light, the second variable splitter configurable to provide a splitting ratio based on the LO light required for amplification of the optical input signal, and the second receiver pump light provided by the first splitter; and
   an optical transmitter configured to receive the signal light and the electrical input signal and to transmit the optical output signal;
   a coherent optical receiver configured to receive the input optical signal and the local oscillator (LO) light and to output the electrical output signal;
   wherein the splitting ratio is configurable based on the desired proportions of the first splitter to trade off receiver dynamic range and transmitter optical signal to noise ratio.

2. The transceiver according to claim 1, wherein the second optical amplifier comprises a free-running optical amplifier configured to amplify the optical input signal;
   wherein the first optical amplifier comprises a gain-controlled optical amplifier configured to amplify the optical output signal; and
   further comprising a first control loop configured to sample the optical output signal and to increase or decrease power to the pump light, thereby increasing or decreasing power to the first transmitter pump light portion for the first optical amplifier to increase or decrease the amplification of the optical output signal, resulting in a corresponding increase or decrease in power to the second receiver pump light portion for the second optical amplifier to increase or decrease the amplification of the optical input signal.

3. The transceiver according to claim 2, wherein the first control loop includes a photodetector for sampling the optical output signal, and a feedback loop controller.

4. The transceiver according to claim 2, further comprising a variable optical attenuator (VOA) configured to attenuate the optical input signal in response to amplification of the optical input signal by the second optical amplifier resulting from an increase in power to the pump light for amplification of the optical output signal by the first optical amplifier.

5. The transceiver according to claim 4, further comprising a second control loop configured to sample a portion of an output from the coherent optical receiver, and provide a control signal to the variable optical attenuator for controlling optical power of the optical input signal received by the coherent optical receiver based on amplification by the second optical amplifier, and an optical power of the LO light.

6. The transceiver according to claim 1, wherein the second shared optical source comprises a wavelength-tunable laser, and the first shared optical source comprises a pump laser.

7. The transceiver according to claim 1, wherein at least one of the first optical amplifier and the second optical amplifier comprises a fiber amplifier.

8. The transceiver according to claim 1, wherein the first splitter is configured to split the pump light, whereby the second transmitter pump light portion is smaller than the first receiver pump light portion.

9. The transceiver according to claim 8, wherein the first splitter is configured to split the pump light by a 1:4 ratio, whereby the first transmitter pump light portion comprises four times as much pump power as the second receiver pump light portion.

10. The transceiver according to claim 1, further comprising a first optical coupler configured to couple the first transmitter pump light portion into the first optical amplifier; and a second optical coupler configured to couple the second receiver pump light portion into the second optical amplifier.

11. The transceiver according to claim 4, wherein the first control loop is configured to vary current to the first shared optical source in dependence upon power of the output optical signal.

12. The transceiver according to claim 11, wherein the second variable splitter is configured to lower power of the LO light when gain in the second optical amplifier increases.

13. A method of operating an optical transceiver comprising an optical transmitter for transmitting an output optical signal, and a coherent optical receiver for receiving an input optical signal and generating an output electrical signal, the method comprising:
    generating input light with a first shared optical source;
    generating pump light with a second shared optical source;
    splitting the pump light generated by the second shared optical source with a first splitter into first and second portions, and providing the first portion to a first optical amplifier based on required amplification of the optical output signal, and a smaller second portion to a second optical amplifier to amplify the input optical signal, thereby improving output optical signal to noise ratio (OSNR) for the optical transmitter by providing a greater portion of the pump light from the second shared optical source to the first optical amplifier in the optical transmitter; and
    splitting the input light from the first shared optical source into an optical signal light and local oscillator (LO) light with a second variable splitter, and providing the optical signal light to the optical transmitter and the LO light to the coherent optical receiver, with a splitting ratio based on the LO light required for amplification of the input optical signal, and the second portion provided by the first splitter;
    controlling the splitting ratio of the second variable splitter to provide a desired receiver dynamic range and transmitter OSNR.

14. The method according to claim 13, wherein the first optical amplifier comprises a gain-controlled optical amplifier configured to amplify the output optical signal;
    wherein the second optical amplifier comprises a free-running optical amplifier configured to amplify the input optical signal; and
    further comprising controlling amplification of the first optical amplifier with a first control loop based on sampling the output optical signal.

15. The method according to claim 14, further comprising attenuating the input optical signal received by the coherent optical receiver using a variable optical attenuator in a second control loop in dependence on amplification of the second optical amplifier, an optical power of the LO light, and the output electrical signal.

16. The method according to claim 14, wherein the controlling amplification of the first optical amplifier comprises varying pump power generated by the second shared optical source in dependence upon a sample of the output optical signal at an output of the first optical amplifier.

17. The method according to claim 13, wherein the second variable splitter is configured to lower power of the LO light when gain in the second optical amplifier increases.

* * * * *